No. 855,547. PATENTED JUNE 4, 1907.
L. E. WHITAKER.
WEEDER AND HOE.
APPLICATION FILED APR. 16, 1906.
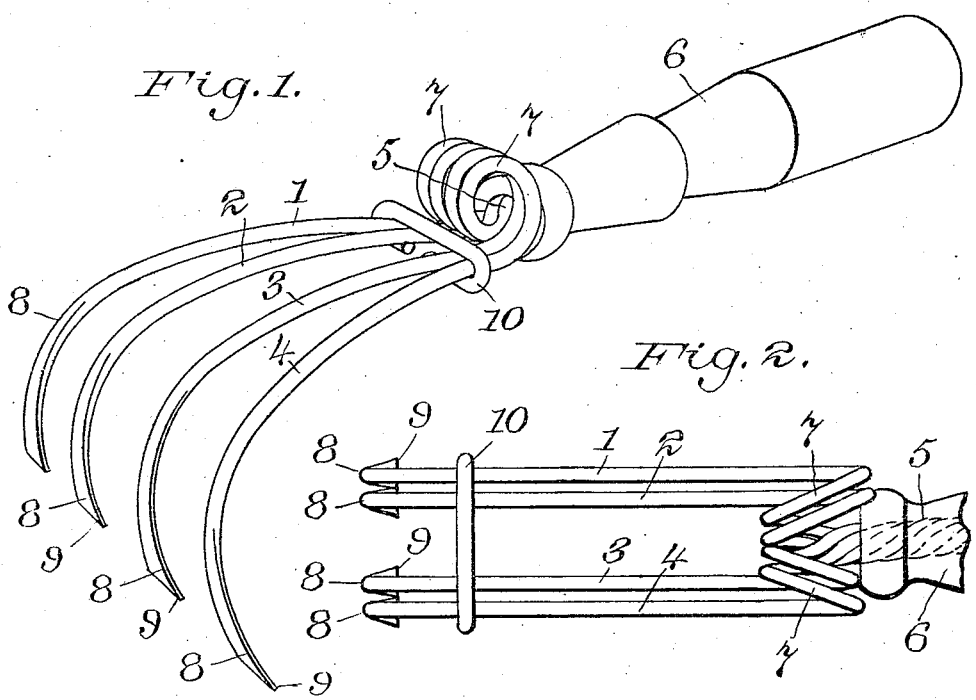
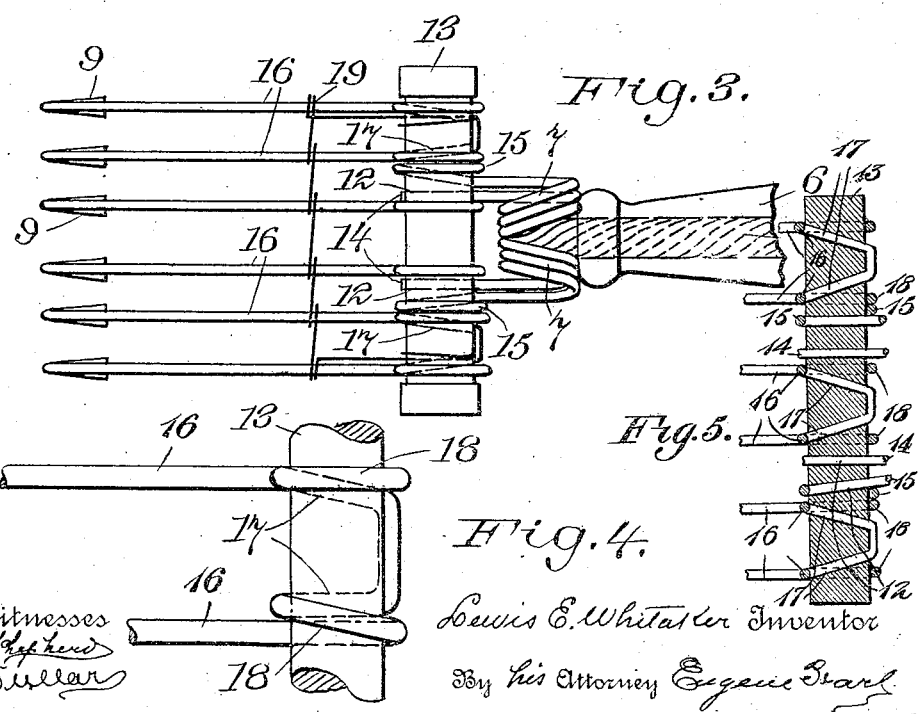

UNITED STATES PATENT OFFICE.

LEWIS E. WHITAKER, OF SUSSEX, NEW JERSEY.

WEEDER AND HOE.

No. 855,547.  Specification of Letters Patent.  Patented June 4, 1907.

Application filed April 16, 1906. Serial No. 312,052.

*To all whom it may concern:*

Be it known that I, LEWIS E. WHITAKER, a citizen of the United States, residing at Sussex, New Jersey, have invented certain new and useful Improvements in Weeders and Hoes, of which the following is a specification.

My invention relates generally to agricultural implements and as herein embodied is designed for use as a gardening tool of the rake type.

In the accompanying drawings I have illustrated several forms of the tool constructed in accordance with my invention.

In the drawings Figure 1 is a view in perspective of the preferred form of tool. Fig. 2 is a plan view thereof showing the tines drawn together in pairs to serve as cutters for weeds, etc. Fig. 3 is a similar view of a modified form of tool. Fig. 4 is an enlarged detail view of a portion of the rake-head shown in Fig. 3, and Fig. 5, is a horizontal sectional view taken centrally of the rake-head.

Referring now to the drawings, the tool shown in Figs. 1 and 2, is formed of a series of wires 1, 2, 3, 4 etc., which are twisted together as indicated to form a shank 5. The shank 5 thus formed is fitted or driven into the socketed end of a handle 6, and at a point adjoining the projecting end of the shank, the wires are bent up in pairs to form obliquely disposed coils 7, and the ends thereof are carried forward and bent over to serve as tines 8, which terminate in flattened extremities 9. As formed, the tines tend to separate and are held about equispaced by means of a sliding link 10, which may be moved from the position shown in Fig. 1 to that shown in Fig. 2, to draw the tines together causing them to unite in pairs to serve as cutters, when the tool is to be used for chopping weeds, digging, etc.

In the tool shown in Figs. 3, 4 and 5 a greater number of wires are employed to form the shank, there being six shown, which are bent up as above described to form the obliquely disposed coils 7, and the free ends thereof extend forward through openings 12 of a cross bar, rod or the like 13 which serves as the rake head. These wires may terminate at the opposite side of the head 13 as indicated at 14 or may be given a turn around the same after passing through the openings thereof as indicated at 15. In this instance the tines are shown as formed of separate wires 16, which are first bent up into U-form and after the ends are passed through openings 17, in the rake head, they are bent around the same as at 18, and are then carried forward and given suitable shape to serve as tines—being preferably flattened at their extremities. As this form of the tool is designed for heavier work than the tool illustrated in Figs. 1 and 2, the sliding link is replaced by a tie wire 19, by which the tines are held from spreading.

The many important advantages of my invention will be apparent from the foregoing description.

Having therefore described my invention, I claim:

1. A tool, the shank of which is formed of a series of wires secured together and having their free ends bent up into obliquely disposed coils, a bar extending transversely of the coils and provided with openings through which the wires project, and a series of tines connected with the shank through the coils.

2. A tool, the shank of which is formed of a series of wires secured together and having their free ends bent up into obliquely disposed coils terminating in tines, and means for spacing the tines.

3. A tool, the shank of which is formed of a series of wires secured together and having their free ends bent up into obliquely disposed coils terminating in tines, and a sliding member co-acting with the tines to vary the spacing thereof.

In testimony whereof, LEWIS E. WHITAKER has signed his name to this specification in the presence of two subscribing witnesses, this 31st day of March 1906.

L. E. WHITAKER.

Witnesses:
 FRANK HOLBERT,
 FREDERICK W. LAURENCE.